United States Patent
Athas et al.

(10) Patent No.: US 11,098,742 B2
(45) Date of Patent: Aug. 24, 2021

(54) TACKING FASTENER

(71) Applicant: ALLFAST FASTENING SYSTEMS, City of Industry, CA (US)

(72) Inventors: Gregory Athas, Monrovia, CA (US); Omar Emil Honegger, Covina, CA (US)

(73) Assignee: ALLFAST FASTENING SYSTEMS, City Of Industry, CA (US)

( * ) Notice: Subject to any disclaimer, the term of this patent is extended or adjusted under 35 U.S.C. 154(b) by 131 days.

(21) Appl. No.: 16/233,729

(22) Filed: Dec. 27, 2018

(65) Prior Publication Data

US 2019/0195260 A1 Jun. 27, 2019

Related U.S. Application Data

(60) Provisional application No. 62/610,553, filed on Dec. 27, 2017.

(51) Int. Cl.
*F16B 13/04* (2006.01)
*F16B 19/10* (2006.01)
*F16B 5/04* (2006.01)

(52) U.S. Cl.
CPC ............ *F16B 19/1072* (2013.01); *F16B 5/04* (2013.01); *F16B 19/109* (2013.01); *F16B 19/1054* (2013.01); *F16B 19/1063* (2013.01); *F16B 2019/1009* (2013.01)

(58) Field of Classification Search
CPC .............. F16B 19/1054; F16B 19/1045; F16B 19/1072; F16B 2019/1009
USPC .......................................................... 411/43
See application file for complete search history.

(56) References Cited

U.S. PATENT DOCUMENTS

| | | | |
|---|---|---|---|
| 2,959,999 A | 11/1960 | Wing | |
| 4,627,775 A * | 12/1986 | Dixon | F16B 19/1054 411/34 |
| 4,877,362 A * | 10/1989 | Berecz | B29C 65/602 411/34 |
| 4,904,133 A * | 2/1990 | Wright | B21J 15/045 29/512 |
| 4,936,725 A * | 6/1990 | Eshraghi | F16B 19/1054 29/525.02 |
| 5,135,340 A | 8/1992 | Stinson | |
| 5,599,147 A | 2/1997 | Luhm | |
| 5,689,873 A * | 11/1997 | Luhm | B23B 41/00 29/525.11 |
| 5,915,901 A * | 6/1999 | Aasgaard | B29C 65/602 411/107 |

(Continued)

FOREIGN PATENT DOCUMENTS

| | | |
|---|---|---|
| GB | 472329 | 9/1937 |
| GB | 1250162 | 10/1971 |

OTHER PUBLICATIONS

Innternational Searching Authority, European Patent Office, International Search Report and Written Opinion for PCT/US2018/067661, dated Mar. 8, 2019.

*Primary Examiner* — Gary W Estremsky
(74) *Attorney, Agent, or Firm* — McDonald Hopkins LLC

(57) ABSTRACT

A blind tacking rivet includes a stem and a sleeve. The stem includes a body and a stem head. The stem head is removable from the body. The stem head deforms a portion of the sleeve during removal of the stem head. The stem head may be discarded or may be embedded within the sleeve.

16 Claims, 9 Drawing Sheets

(56) References Cited

U.S. PATENT DOCUMENTS

| | | | | |
|---|---|---|---|---|
| 6,077,009 | A * | 6/2000 | Hazelman | B21J 15/043 411/34 |
| 6,299,398 | B1 * | 10/2001 | Shinjo | F16B 19/1036 411/42 |
| 6,551,040 | B1 * | 4/2003 | Terry | F16B 19/1054 411/43 |
| 7,150,594 | B2 * | 12/2006 | Keener | F16B 19/1054 411/34 |
| 8,328,483 | B2 | 12/2012 | Jones | |
| 8,366,363 | B2 | 2/2013 | Jones | |
| 8,579,567 | B2 * | 11/2013 | Escarpit | F16B 19/1045 411/43 |
| 9,061,379 | B1 * | 6/2015 | Mead | B21J 15/00 |
| 2003/0123947 | A1 * | 7/2003 | Eshraghi | F16B 19/1063 411/43 |
| 2015/0019216 | A1 | 7/2015 | Makino | |
| 2015/0275953 | A1 | 10/2015 | Gunther | |

* cited by examiner

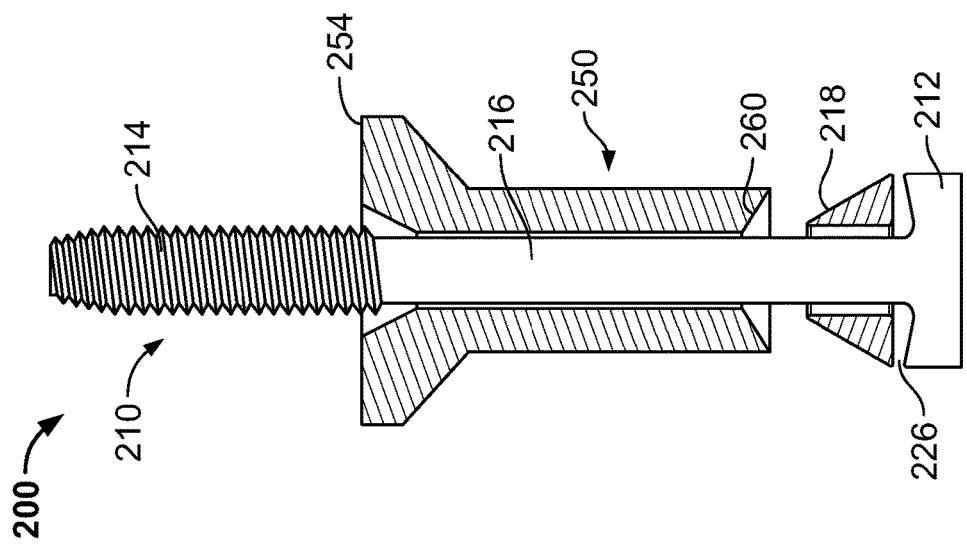
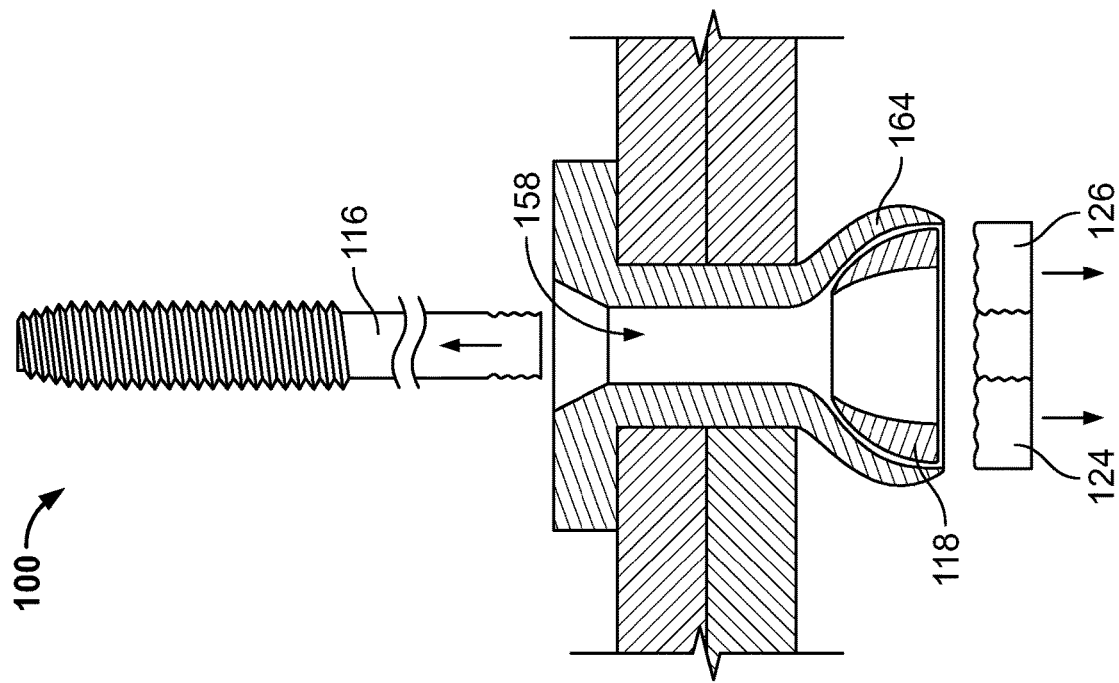

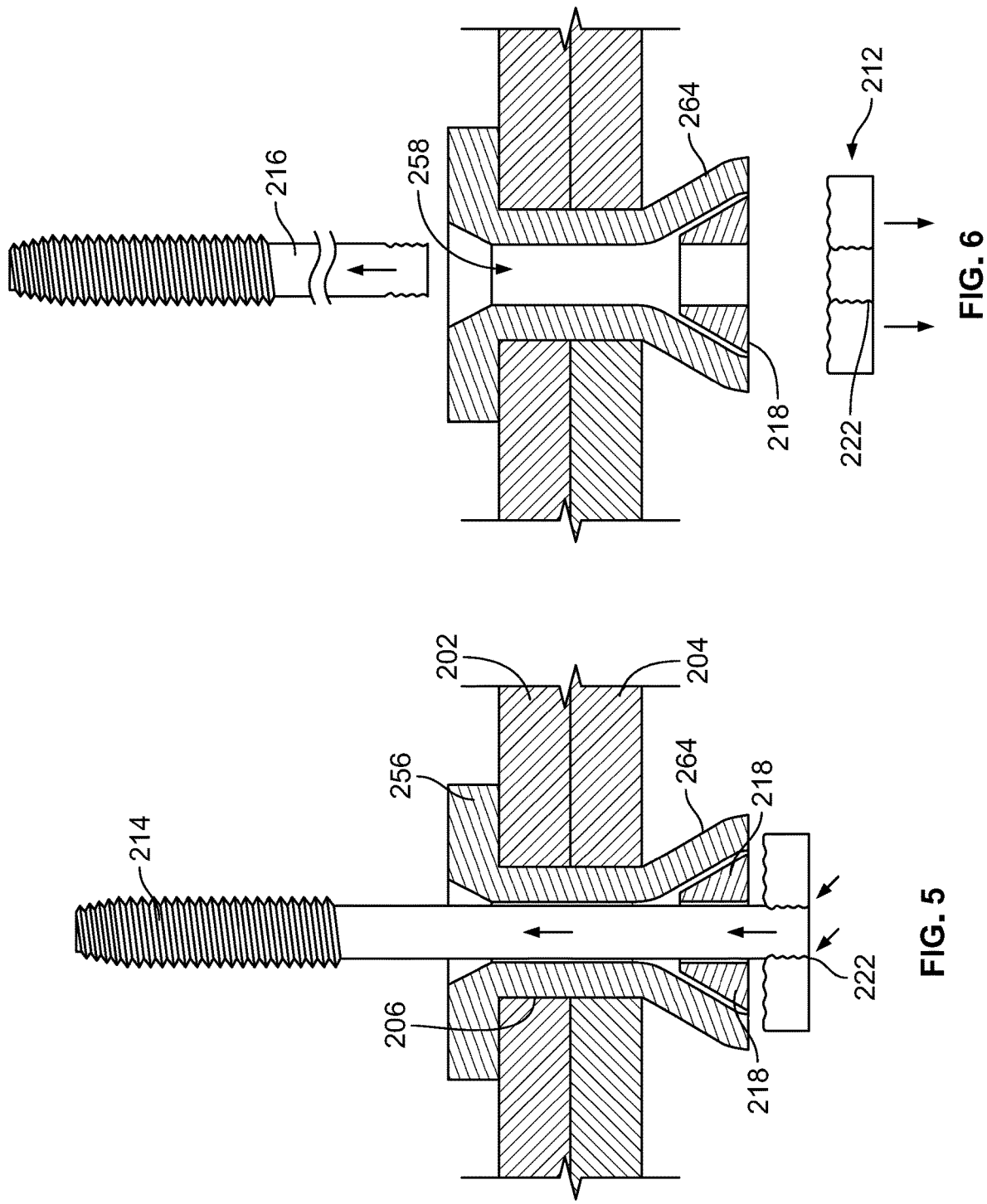

TACKING FASTENER

CROSS-REFERENCE TO RELATED APPLICATION

This application claims priority to U.S. Provisional Patent Application No. 62/610,553 entitled "TACKING FASTENER," filed on Dec. 27, 2017, which is incorporated herein by reference in its entirety.

FIELD OF INVENTION

The present invention relates to the field of temporary fasteners, as are typically used to hold workpieces together while permanent fasteners are installed.

BACKGROUND

Temporary fasteners are frequently used in manufacturing to hold workpieces together while permanent fasteners are installed. Such fasteners are installed in a few holes in the workpieces to align and pull the parts together that are to be joined so that permanent fasteners may be installed in the remaining holes, after which the temporary fasteners are removed for installation of permanent fasteners in these holes also.

Ideal temporary fasteners may have various characteristics, depending on their application. In general, as previously mentioned, temporary fasteners are intended to align and pull the parts together so that permanent fasteners may be installed. Consequently, a temporary fastener should have the capability of pulling together workpieces that may initially have a substantial separation (commonly referred to as "sheet takeup"), so that the installer does not have to resort to other means to pull the workpieces together sufficiently to properly install the temporary fastener.

Also, while the workpieces will not be subjected to the same loads they may encounter in use after the permanent fasteners are installed, the temporary fasteners typically will only be installed in a small percentage of the fastener holes in the workpieces, such as every tenth hole or so. This, plus a desired large and strong sheet takeup capability, makes temporary fastener strength an important parameter.

Other important parameters for temporary fasteners include low fastener cost, and ease of installation and removal. Simplicity of fastener design and assembly, together with a simple installation operation contributes to low cost and ease of operation, as does a large and strong sheet take-up capability. Removal of temporary fasteners varies with the fastener design, some fasteners being disassembled for removal and others being drilled out for removal. Drilling out of temporary fasteners is perfectly acceptable and may be a favored method of temporary fastener removal, provided the fastener is a low cost fastener and the drilling operation itself doesn't foster other complications.

In an example, rivets fasten workpieces for a fuselage of an airplane. Temporary fasteners are typically installed into adjacent parts to insure that the workpieces do not become separated during the installation of the permanent rivets. The temporary fasteners are eventually removed and replaced with a permanent rivet. Blind rivets are typically utilized when workpieces are not fully accessible. These blind rivets only require one side of the workpiece to be accessible. As described in U.S. Pat. No. 5,689,873 entitled "Tacking Fastener" and assigned to the assignee of the present invention, temporary blind fasteners typically contain a pull stem and a sleeve which extends through a hole drilled through the workpieces. The sleeve has a head which prevents the fastener from falling into the "blind" side of the assembly. The pull stem head has a head that is completely pulled through the sleeve to expand the sleeve and secure the fastener to the workpieces. The temporary fastener is eventually removed by drilling through the head and the sleeve with a drill of the proper diameter for the sleeve of the permanent rivet to be installed.

Drilling of temporary fasteners often results in scratching or other damage to the workpiece. Moreover, chips that break off of the fastener may lead to damage of the workpiece, may fall into components, or may bind a drill bit. It would be beneficial to provide a fastener that does not break into large chips, reduces potential for damage to a workpiece, and provides for more efficient fastening.

SUMMARY

The following presents a summary of this disclosure to provide a basic understanding of some aspects. This summary is not intended to identify key or critical elements or define any limitations of embodiments or claims. Furthermore, this summary may provide a simplified overview of some aspects that may be described in greater detail in other portions of this disclosure.

A blind tacking fastener is shown and described. The blind tacking fastener includes a stem comprising a gripping portion, a stem head, and a body extending from the stem head to the gripping portion. The blind tacking fastener further includes a sleeve comprising an inner channel, wherein the body of the stem passes through the inner channel, and wherein the stem comprises a first material and the sleeve comprises a second material selected such that stem head fractures from the body from a pulling force exerted on the gripping portion. The diameter of the stem head may be generally equal to a diameter of a body of the sleeve. The stem head may be operatively embedded within the sleeve as a result of the pulling force. The sleeve may comprise at least one of aluminum or an aluminum alloy. The stem may comprise steel. The sleeve may further comprise a first end comprising an annular shoulder and a second end. The second end may comprise an inner perimeter and an outer perimeter, the inner perimeter generally offset from the outer perimeter. The blind tacking fastener may comprise a bulb disposed between the stem head and end of the sleeve.

A method of installing a blind tacking fastener is described. The method may comprise providing a tacking fastener comprising a stem and a sleeve, the stem having a serrated portion and a stem head, inserting the stem and sleeve through one or more apertures of one or more workpieces such that the stem head is on a blind side of the workpiece, applying a pulling force to the serrated portion, and detaching the stem head within the sleeve. The method may include embedding the stem head within the sleeve. The pulling force may deform a surface of the sleeve abutting the stem head. The stem may be removed from the sleeve while the stem head is removed from the stem. The method may also include drilling out the sleeve to apply a permanent fastener. In at least one embodiment, the method may include selecting at least one of a material used or dimension of the sleeve to allow for removal of the stem head from the sleeve. In another example, the method may include selecting at least one of a material used or dimension of the sleeve to allow for embedding of the stem head within the sleeve.

A blind tacking fastener is described as including a stem comprising a gripping portion, a stem head, and a body extending from the stem head to the gripping portion. The blind tacking fastener further includes a sleeve comprising an inner channel, wherein the body of the stem passes through the inner channel, and a bulb positioned about the body of the stem, between the stem head and the sleeve. The bulb may be a separate construction from the stem or may be a unitary construction with at least one of the stem head or the body. The bulb may include a generally frustoconical cross-sectional shape when not deformed. An end of the sleeve proximal the bulb may be angled towards the inner channel to directed the bulb towards the channel.

The following description and the drawings disclose various illustrative aspects. Some improvements and novel aspects may be expressly identified, while others may be apparent from the description and drawings.

BRIEF DESCRIPTION OF THE DRAWINGS

The accompanying drawings illustrate various systems, apparatuses, devices and related methods, in which like reference characters refer to like parts throughout, and in which:

FIG. 3 is a side, cross-sectional view of the blind tacking rivet of FIG. 1 after it is installed in accordance with embodiments disclosed herein;

FIG. 4 is a side, cross-sectional view of a blind tacking rivet having an angled bulb in accordance with embodiments disclosed herein;

FIG. 5 is a side, cross-sectional view of the blind tacking rivet of FIG. 4 as it is being installed in accordance with embodiments disclosed herein;

FIG. 6 is a side, cross-sectional view of the blind tacking rivet of FIG. 4 after it is installed in accordance with embodiments disclosed herein;

DETAILED DESCRIPTION

Figure 2:
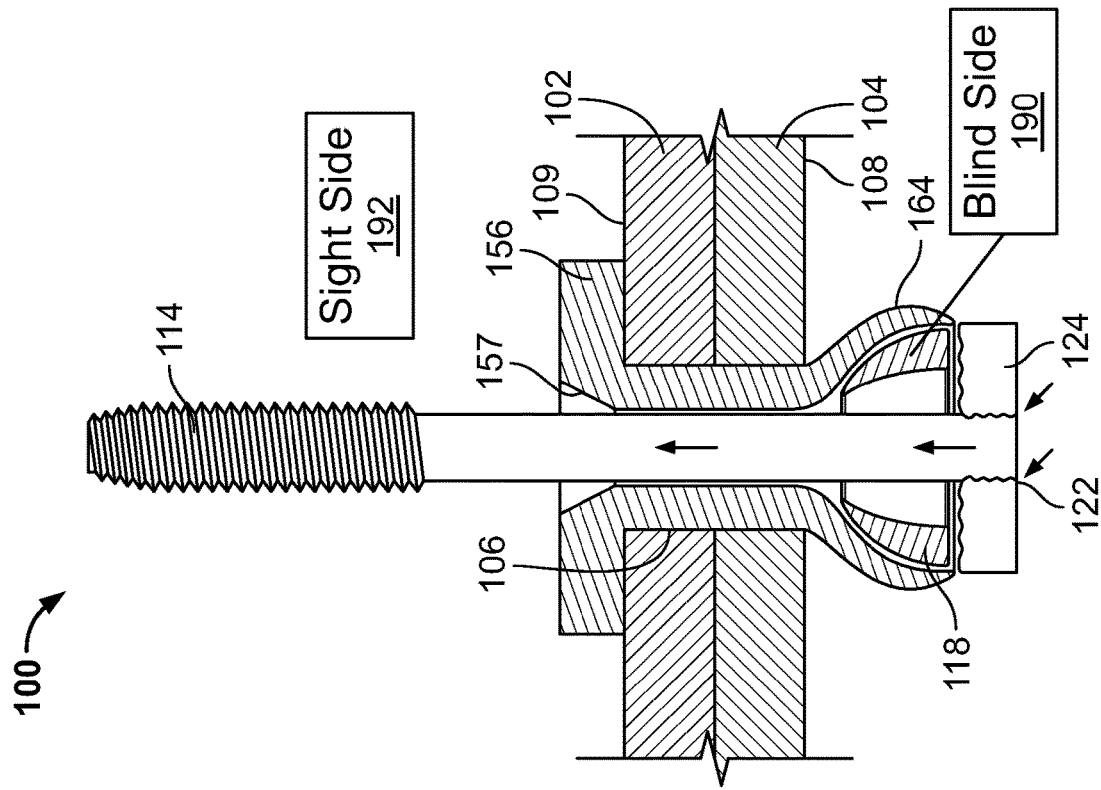
FIG. 2 is a side, cross-sectional view of the blind tacking rivet of FIG. 1 as it is being installed in accordance with embodiments disclosed herein.

Reference will now be made to exemplary embodiments, examples of which are illustrated in the accompanying drawings. It is to be understood that other embodiments may be utilized, and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" mean an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

As used herein, terms such as "user," "operator," and the like are employed interchangeably throughout the subject specification, unless context suggests otherwise or warrants a particular distinction among the terms. It is noted that such terms may refer to human entities or automated components such as automated robotic assembly devices. Such devices may be controlled by a user, supported through artificial intelligence (e.g., a capacity to make inference), programmed for a particular user, or the like. For instance, examples describing a user drilling a tack rivet may include a human user with a hand held drill, a human operating a robotic arm having a drill, an automated machine that utilizes a drill, or the like.

Described embodiments generally refer to temporary tack rivets that may hold two workpieces together. Such rivets may be utilized in a variety of applications including automotive and aerospace applications. As such, references to particular applications (e.g., automotive applications or aerospace applications) are for illustrative purposes. Moreover, the term "workpiece" may refer to any piece of material that is to be held together with another piece of material. While workpieces may be described as metal, the materials utilized may vary.

Tack rivets described herein may provide structural integrity to the workpieces. Moreover, the tack rivets may be drilled out and a permanent rivet or other fastener may be installed in the workpieces. Disclosed rivets may comprise various materials, such as aluminum alloys (e.g., 2017, 2117, 2024, 5056, 7050, 7075 aluminum alloy), other metals, plastics, or the like.

The disclosed tack rivets generally comprise a shank or sleeve and a pin or stem. It is noted that the terms "sleeve" and "shank" may be used interchangeably, likewise the terms "pin" and "stem" may be used interchangeably. The stem may be solid or hollow. Moreover, the stem may include a head on one end and a gripping portion (e.g., a grooved or serrated region). The sleeve comprises a body having an inner channel. Once installed into a workpiece, the stem is pulled and the head of the stem is removed. In examples, the head of the stem deforms a blind side of the sleeve. The head is operatively separated from the stem and may be discarded. In some examples, the head may be embedded within the sleeve or may be completely detached from the sleeve and the stem. The installed sleeve may fasten together workpieces and may be drilled out or otherwise removed at a later time.

For instance, a body of the stem is disposed through an inner channel of the sleeve. The assembled stem and sleeve are inserted into apertures of workpieces. A collar of the sleeve abuts a workpiece on the non-blind side and prevents the sleeve from passing through the apertures. The pull stem includes a detachable head on the blind side. The head is sized generally smaller in diameter or perimeter than the apertures so that it may pass therethrough but is larger than the perimeter of the inner channel of the sleeve. A user pulls the pull stem from the non-blind side via the serrated portion. The head deforms the blindside of the sleeve as the pull stem is pulled from the non-blind side. The head becomes detached therefrom. The head may be embedded in the material of the sleeve. In some embodiments, the head may not be embedded in the sleeve and may be discarded. The sleeve may be later drilled out with a drill head. The drill head may comprise a diameter that is larger than the diameter of a head of the sleeve.

The head of a sleeve of disclosed embodiments may include three or more recesses or cut-outs formed around the periphery of the head of the sleeve. In at least one aspect, the head includes four recesses that are spaced apart from each other. As the head is drilled, chip pieces from the head are removed by the drill bit. The recesses break up the chip sizes. The reduced chip sizes prevent or reduce the chances of scratching the workpiece, binding flutes of a drill bit, or the like. It is noted that four cut-outs have been found to provide particularly desirable results even as opposed to heads with three cut-outs. Furthermore, four evenly spaced cut-outs prevent the head from coming apart in large sections, which may be particularly undesirable as such sections may bind a drill bit, scratch a workpiece, become lost in a part, or otherwise provide negative effects. It is noted, however, that some embodiments may not include recesses in the head of the sleeve.

Figure 1:
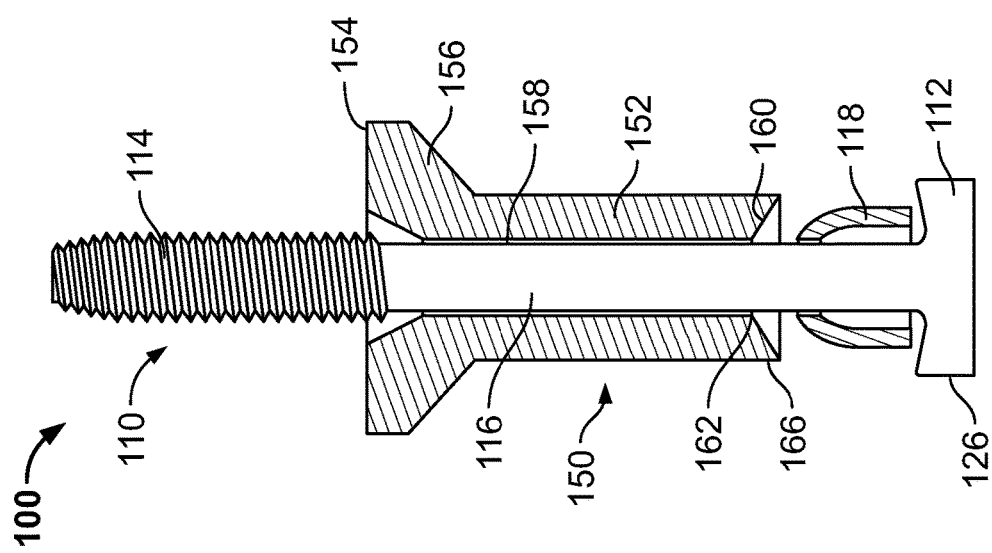
FIG. 1 is a side, cross-sectional view of a blind tacking rivet in accordance with embodiments disclosed herein.
Figure 8:
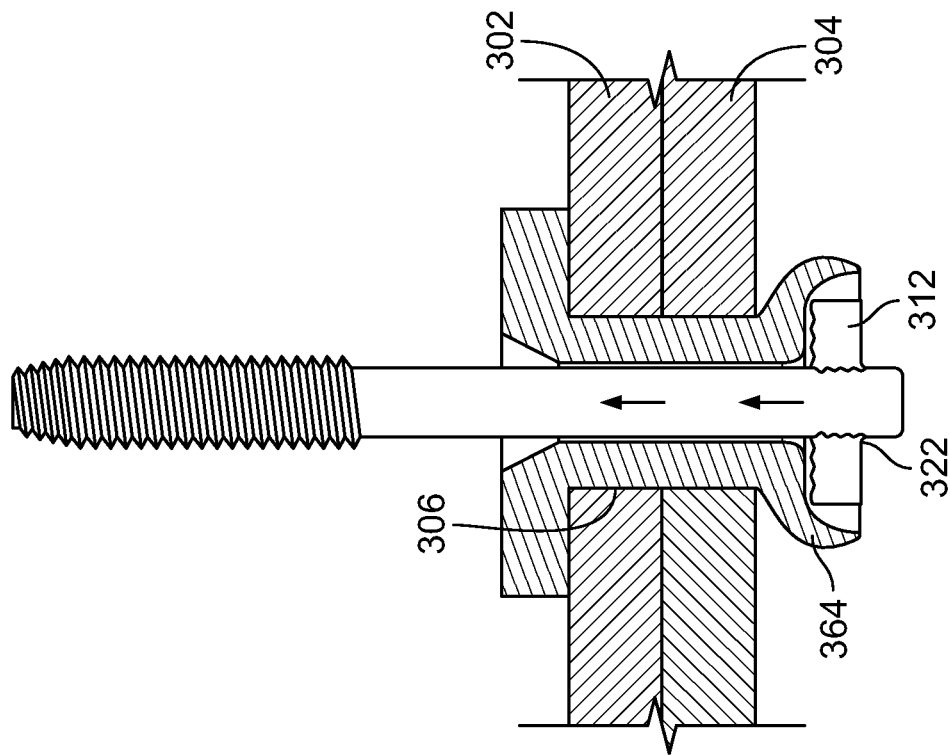
FIG. 8 is a side, cross-sectional view of the blind tacking rivet of FIG. 7 as it is being installed in accordance with embodiments disclosed herein.
Figure 7:
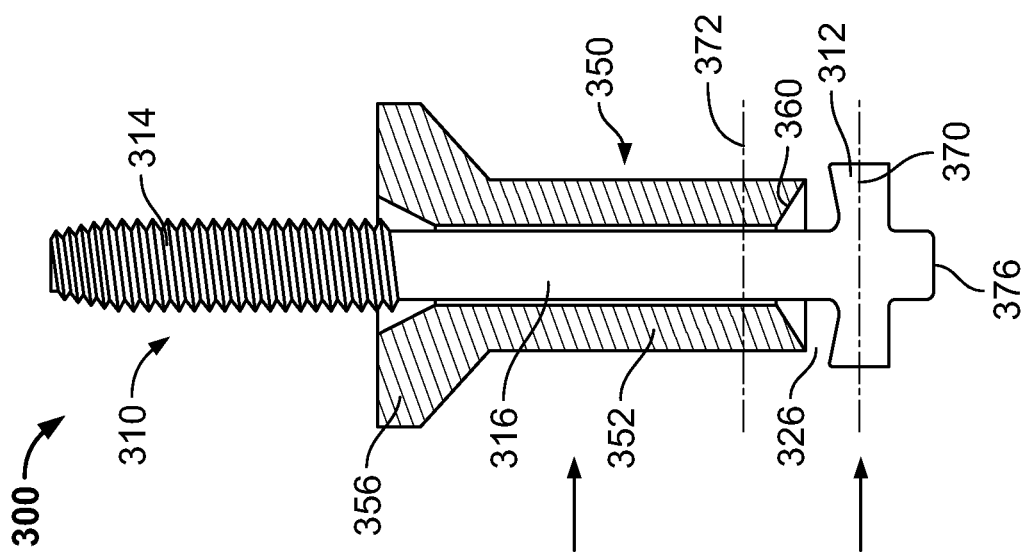
FIG. 7 is a side, cross-sectional view of a blind tacking rivet without a bulb in accordance with embodiments disclosed herein.

FIGS. 1-3 depict a tack rivet 100 in a pre-installation, installing, and installed phase, respectively. The tack rivet 100 primarily includes a stem 110 and a sleeve 150. The stem 110 and the sleeve 150 are operatively inserted within an aperture 106 to secure together a first work piece 102 and a second work piece 104. The tack rivet 100 may comprise a temporary tack rivet that may be removed at a later time, such as when permanently fastening together the first and second work pieces 102, 104. It is noted that the tack rivet 100 may be assembled or constructed according to various methods. Moreover, components of the tack rivet 100 may comprise various materials, such as appropriate metals and alloys.

Stem 110 may generally comprise a generally cylindrical body 116 extending from a stem head 112 to a serrated portion 114. The body 116 may be solid, hollow, or the like. In an aspect, the body 116 may be inserted within an inner channel 158 of the sleeve 150 as described herein. The serrated portion 114 may comprise formations that provide a gripping surface. As such, the serrated portion 114 may comprise a portion of the body 116 that has serrations, ridges, a roughened surface, or the like. The stem head 112 may comprise a generally annular protrusion or ring member. In an aspect, the outer perimeter of the stem head (e.g., circumference for annular stem heads) may generally prevent the stem head 112 from passing through the inner channel 158 of the sleeve 150.

The sleeve 150 may comprise the sleeve body 152 extending from the first end 154 to the second end 160. The first end 154 may include an annular shoulder 156. The annular shoulder 156 may be operatively sized to prevent the annular shoulder 156 from passing through the aperture 158. For instance, the annular shoulder 156 may extend away from a center of the sleeve 150 a greater distance than the sleeve body 152. It is noted that the annular shoulder 156 may comprise one or more sections, chip break areas (as described herein), or the like. In at least one embodiment, the annular shoulder 156 may include a transition portion 157. The transition portion 157 may comprise an annular generally concave portion, frustoconical portion, chamfered portion, or the like.

The second end 160 may comprise an angled or otherwise tapered end 160. The second end 160 may be angled inwards. For instance, an inner perimeter 162 of the second end 160 may extend a lesser distance from the body 152 than an outer perimeter 166 of the body. In an aspect, this may allow for alignment of the stem head 112 and bulb 118 when the body 116 is pulled or removed for installation as described herein.

In exemplary embodiments, a user drills a hole or aperture through the first work piece 102 and the second work piece 104 during an assembly process. While the assembly process is occurring, the user may need to temporarily hold the first work piece 102 and the second work piece 104 so that they maintain operative alignment. Thus, the user may insert the tacking rivet 100 into the aperture 106. The user operatively selects a drill bit for drilling the aperture 106 that will result in generally the same or slightly larger aperture relative to the outer perimeter of the body 152.

The user then pulls the serrated portion 114 of the stem 110 from a first side or a side where the user has access and can see, such as the sight side 192. The backside or blind side 190 is generally not accessible to the user. As the stem is pulled, the bulb 118 aligns with the second end 160. A portion of the body 152 extends beneath the blind surface 108. Thus, as the stem 110 is pulled, this portion is not supported by the aperture 106 and the bulb 118 may force this portion to flare outward as an upset portion 164. The annular shoulder 156, likewise, may be deformed against the top surface 109. As the annular shoulder 156 and the upset portion 164 are deformed, the body 152 is secured within the aperture 106.

The serrated portion 114 may be pulled until the bulb 118 and the stem head 112 may become detached from the body 116. In an example, the stem head 112 which may be referred to as a fraction ring 124 and body 116 may separate at fracture points 122. It is noted that one or more of the bulb 118 or stem head 112 may become embedded within the upset portion 164. This may prevent the bulb 118 or stem head 112 from falling or becoming lost. In other embodiments, the stem head 112 or bulb 118 may be allowed to fall or otherwise not be embedded within the upset portion 164. It is noted that the selection of materials may, for instance, dictate whether the bulb 118 or stem head 112 become embedded or not. For instance, the sleeve 150 may generally comprise a softer material than the stem head 112 and bulb 118. If the softness of the sleeve 150 is sufficiently low enough relative the stem head 112 and bulb 118, they may be embedded into the sleeve 150. If the softness of the sleeve 150 is increased, the stem head 112 and bulb 118 will not be embedded. Moreover, it is noted that the stem head 112 may comprise a material selected such that the stem head 112 becomes detached and not embedded, while the bulb 118 comprises a material selected to be embedded. It is noted that whether the bulb 118 or stem head 112 become embedded or not may depend on a number of adjustable or selectable variables, such as the materials used, the dimensions of the component partes, or the like. For instance, the dimensions of the sleeve 150 may be selected to allow for or prevent the bulb 118 or stem head 112 embedding. In examples, the length of the sleeve 150, thickness of side walls of the sleeve 150, and materials used may be selected such to allow or prevent embedding. It is noted that the if inner diameter of the sleeve 150 and outer diameter sleeve 150 is too thick it will prevent driving of the bolt.

In embodiments, the bulb 118 may comprise a bead-like body having an aperture that receives the body 116 of the stem 110. This may allow the bulb 118 to comprise a separate construction as the stem head 112 and body 116. The surface 126 of the stem head 112 that abuts the bulb 118 may be operatively shaped to align the bulb 118. For instance, the surface 126 may be angled, curved (e.g., concave or convex), tapered, chamfered, or the like.

In other embodiments, the bulb 118 may be unitarily formed with the stem head 112 or body 116, or may be operatively attached thereto (e.g., such as via welding, adhesives, magnetic connections, etc.). For example, the bulb 118 may be cast with the stem head 112 or body 116, welded to the stem head 112 or body 116, or the like.

The bulb 118 may comprise a u-shaped cross section or may comprise other shapes. For instance, the bulb 118 may be cylindrical, spherical, an n-side polygonal shape (where n is a number), irregular in shape, or the like. In some embodiments, the bulb 118 generally tapers towards the body 116 such that a portion of the bulb 118 proximal the stem head 112 has a larger perimeter than the portion of the bulb 118 proximal the second end 160 of the sleeve 150. This may allow the bulb 118 to align with the second end 160 during installation.

Turning to FIGS. 4-6, there is a tacking rivet 200 in accordance with various disclosed embodiments. Tacking rivet 200 may comprise similar aspects as tacking rivet 100 of FIGS. 1-3. For instance, tacking rivet 200 may primarily comprise a stem 210, a sleeve 250 and a bulb 218. Moreover, the tacking rivet 200 may be inserted within an aperture 206 formed through a first workpiece 202 and a second workpiece 204. The tacking rivet 200 may be similarly installed within the aperture 206 as the tacking rivet 100 of FIG. 1. As an example, the user may pull a serrated portion 214 of a body 216 of the stem 210 through an inner channel 258 of the sleeve 250. A stem head 212 and bulb 218 exert pressure or force on a second end 260 of the sleeve 250. This may cause deformed or upset portion 264 to mushroom or extend outwards and prevent the sleeve 250 from passing through the aperture 206. The first end 256 of the sleeve 250 may be flattened (which may result from pulling the stem 210 and/or mechanically flattening the second end 256 from the non-blind side.

The bulb 218 is shown as comprising a frustoconical outer surface with a vertex pointed towards the second end 260. As the serrated portion 214 is pulled, the bulb 218 is aligned with the second end 260. Various embodiments may be embedded or may allow for release of at least one of the bulb 218 or the stem head 212 as described herein. Moreover, bulb 218 may comprise similar aspects as described with reference to bulb 118.

FIGS. 7-10 illustrated a tacking rivet 300 in accordance with various disclosed embodiments. Like named components of tacking rivet 300 may comprise similar aspects as those of tacking rivets 100, 200, and other tacking rivets described herein. For instance, the sleeve 350 and stem 310 may comprise similar aspects as sleeves 150, 250 and stem 110, 210.

The tacking rivet 300 primarily comprises a stem 310, sleeve 350, and a stem head 312. It is noted that the tacking rivet 300 may not include a bulb in at least some embodiments though variations of tacking rivet 300 may include a bulb. Similar to tacking rivets 100 and 200, the tacking rivet 300 may comprise a temporary rivet, which may be a blind rivet. The sleeve 350 and stem 310 are positioned within an aperture 306 formed through work pieces 302 and 304. The stem 310 may be removed by pulling serrated portion 314. As the stem 310 is pulled, the stem head 312 may flatten or otherwise deform a second end 360 of the sleeve 350. This may secure the sleeve 350 in an operative position as described herein.

The stem head 312 may comprise a diameter 370, or cross-sectional width for non-annular embodiments, that is generally equal to a diameter 372 of a sleeve body 352. As such, the stem head 312 and the sleeve body 352 may pass through the aperture 306 to the blind side of the work pieces 302, 304. Moreover, the stem head 312 may be positioned at an end 376 of a body 316 or may be offset from the end 376 as illustrated. A surface 326 of the stem head 312 that is proximal or abuts the end 360 of the sleeve 350 may be generally angled or curved. As the stem 310 is pulled, the surface 326 may flatten or deform from pressure or force of the upset portion 364.

Figure 10:
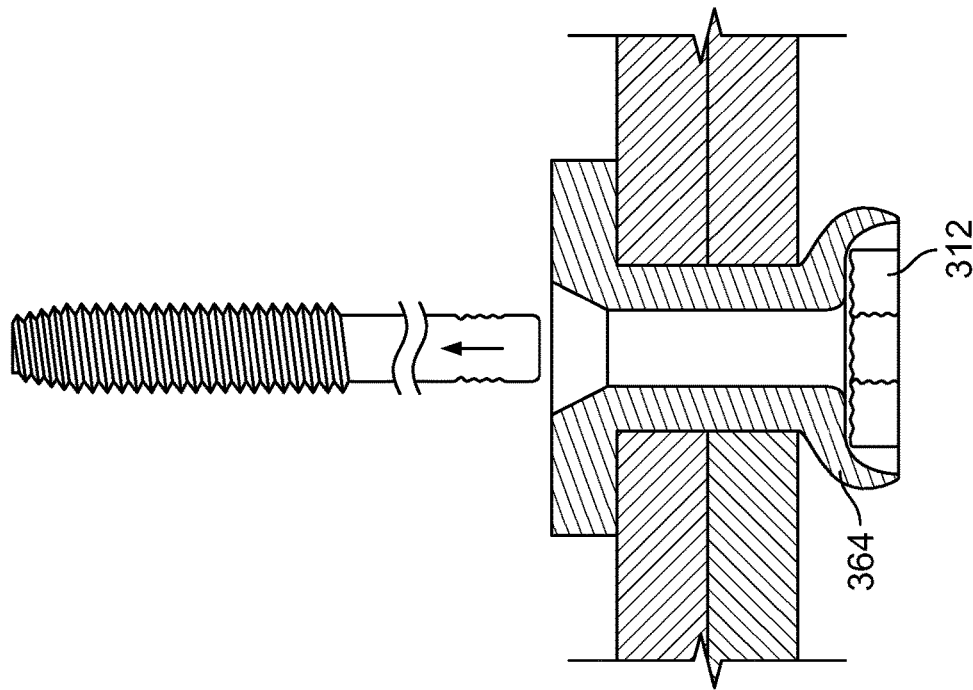
FIG. 10 is a side, cross-sectional view of the blind tacking rivet of FIG. 7 after it is installed with an embedded stem head in accordance with embodiments disclosed herein.
Figure 9:
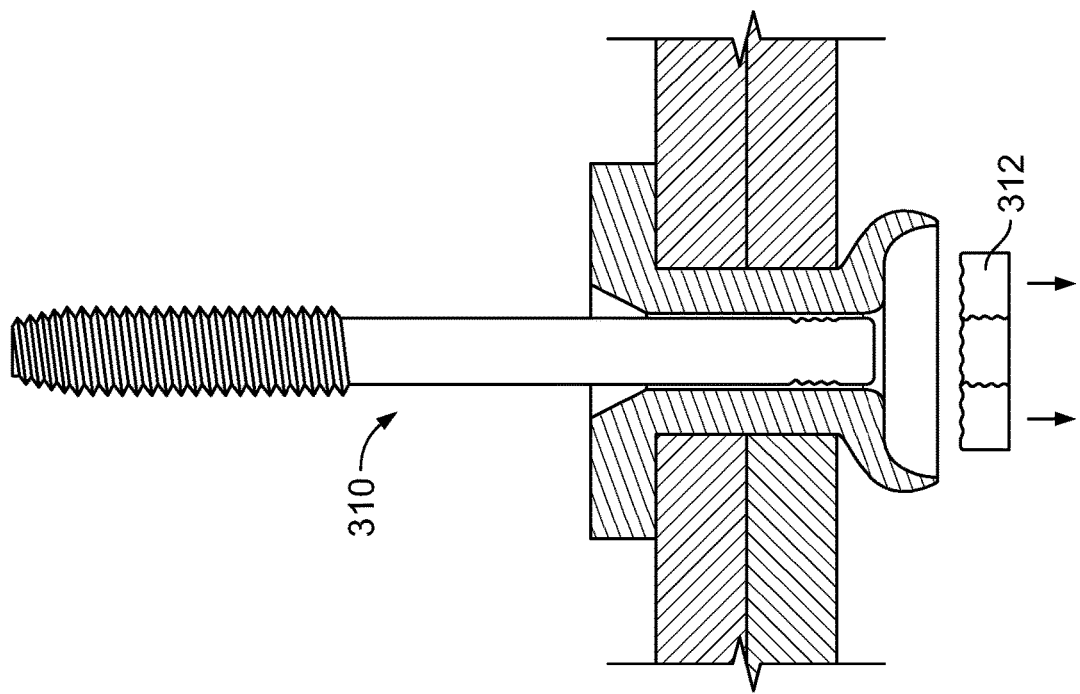
FIG. 9 is a side, cross-sectional view of the blind tacking rivet of FIG. 7 after it is installed with a discarded stem head in accordance with embodiments disclosed herein.
Figure 11:
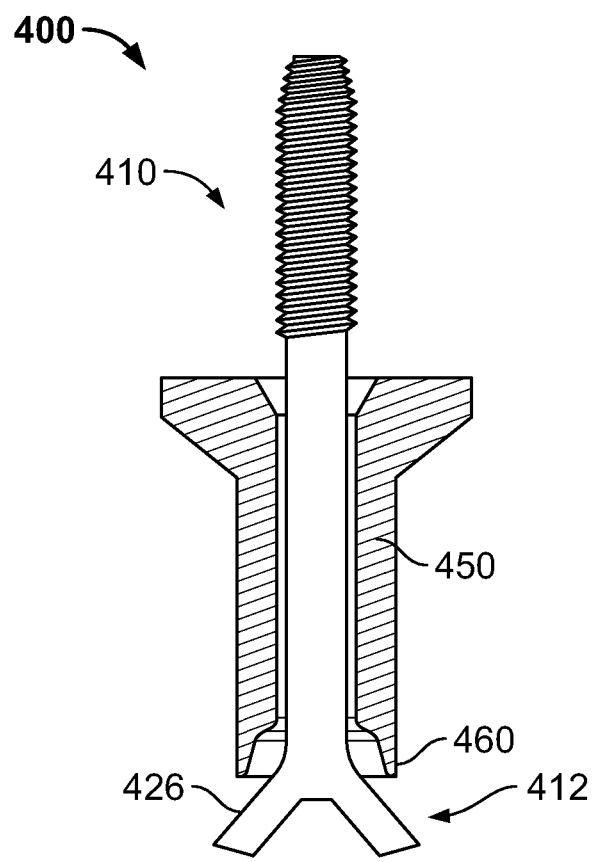
FIG. 11 is a side, cross-sectional view of a blind tacking rivet with a Y-shaped stem head in accordance with embodiments disclosed herein.
Figure 12:
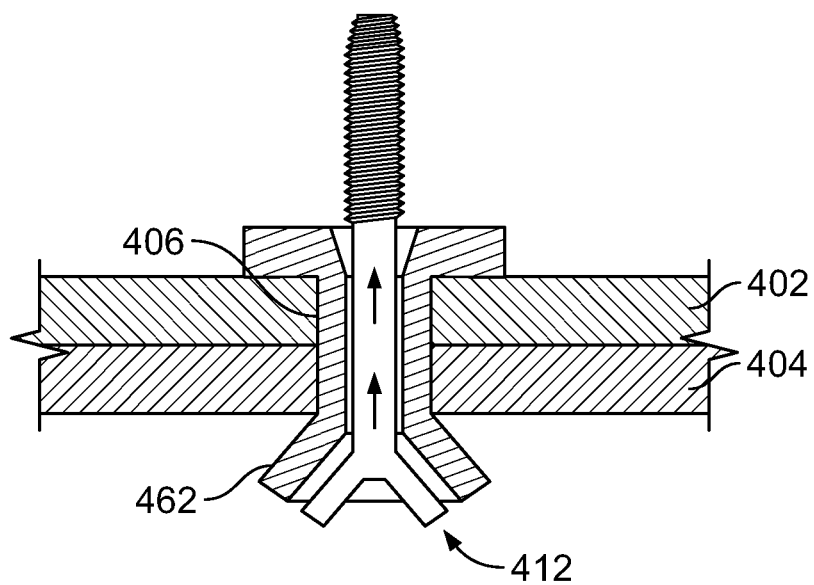
FIG. 12 is a side, cross-sectional view of the blind tacking rivet of FIG. 11 as it is being installed in accordance with embodiments disclosed herein.
Figure 13A:
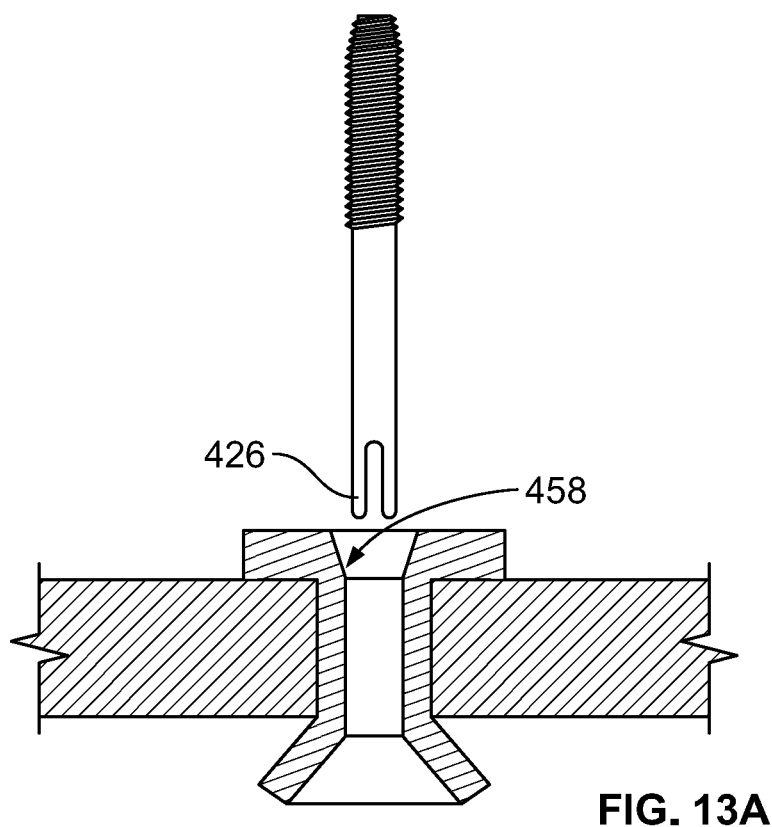
FIG. 13A is a side, cross-sectional view of the blind tacking rivet of FIG. 11 after it is installed with a discarded stem head in accordance with embodiments disclosed herein.
Figure 13B:
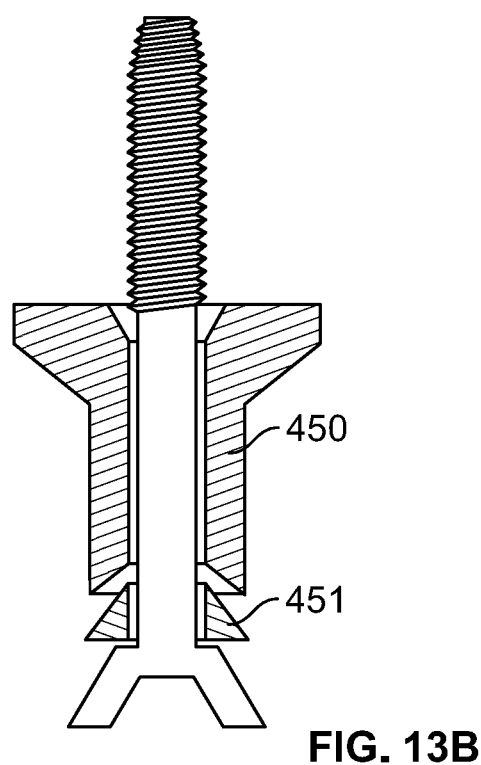
FIG. 13B is a side, cross-sectional view of the blind tacking rivet of FIG. 11 with a wedge-shaped bulb in accordance with embodiments disclosed herein.

When installing, the annular shoulder 356 may be held in place and the stem 310 may be pulled. As the stem head 312 fractures at fracture point 322, the stem head 312 may be embedded within the upset portion 364 (as shown in FIG. 10) or may be freed as shown in FIG. 9. It is noted that the surface 326 may comprise protrusion, anchors, spikes, or other formations that bite or dig into the surface 360 such that the stem head 312 is embedded within the upset portion 364.

FIGS. 11-13A and 13B illustrate a tacking rivet 400 that may primarily comprise a stem 410, a sleeve 450, and a stem head 412 in accordance with various disclosed embodiments. As described herein, the tacking rivet 400 may comprise similar aspects to the various tacking rivets of the other figures. The tacking rivet 400 may be installed into an aperture 406 of a first and second workpiece 402, 404.

The stem head 412 may comprise a "Y" or "V" shape comprising one or more flanges 426 extending from the stem 410. As the stem 410 is pulled, the flanges 426 deform an end 460 of the sleeve 450, so that the upset portions 462 secure the sleeve 450 in the aperture 406. The end 460 may be angled, curved, or the like as described herein. In contrast to some embodiments, the stem head 412 may be deformed such that it passes through an inner channel 458 of the sleeve 450. FIG. 13 B illustrates a nut 451 that may act as a wedge or bulb to deform the sleeve 450 during installation.

Figure 14:
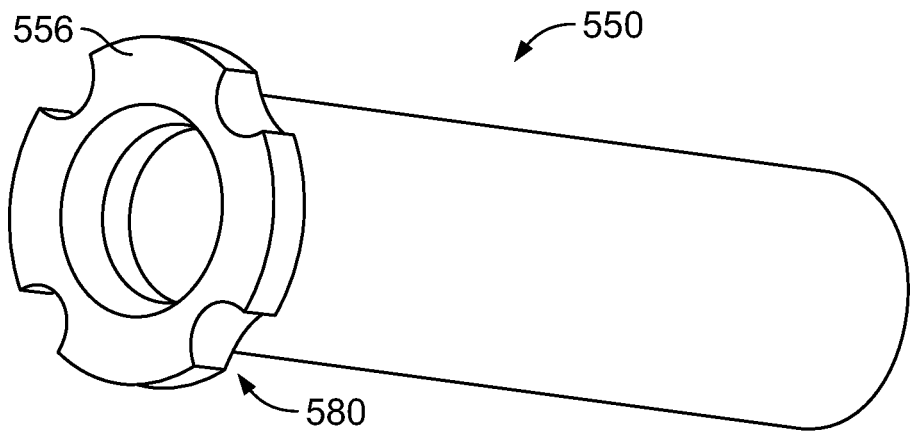
FIGS. 14-16 are views of a sleeve for a blind tacking rivet in accordance with embodiments disclosed herein.
Figure 15:
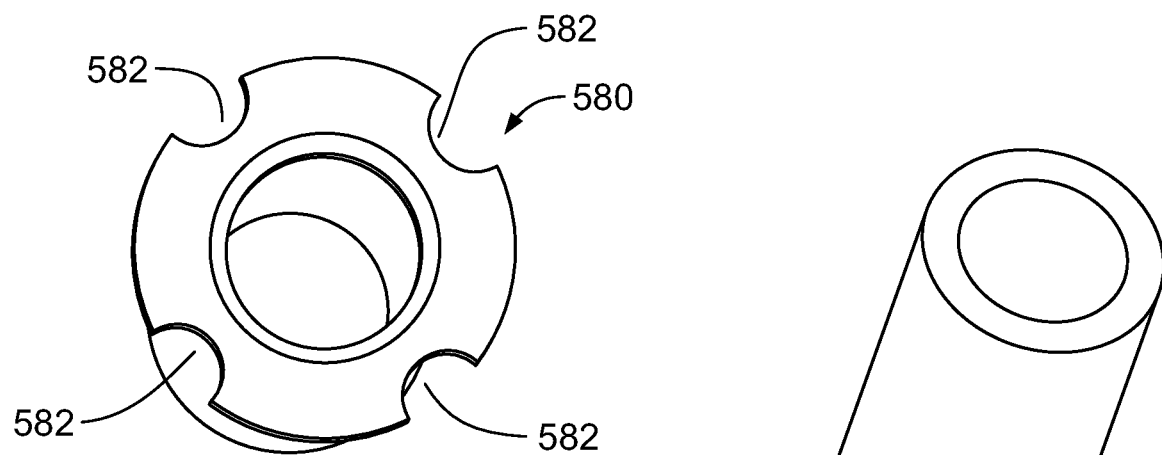
Figure 16:
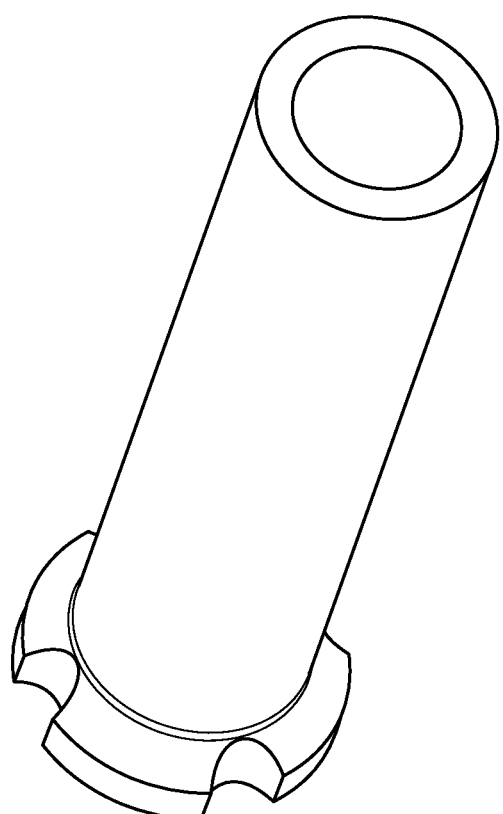

Turning to FIGS. 14-16, there is an exemplary sleeve 550 in accordance with various disclosed embodiments. It is noted that the sleeve 550 may be utilized with various tacking rivets described herein. The annular sleeve 556 may comprise a chip-break feature 580, such as at least three cutouts 582 (e.g., three, four, five, etc.). The cutouts 582 may be spaced apart the annular sleeve 556. In an aspect, when the sleeve 550 is installed in one or more workpieces, the user drills out the annular sleeve 556. The cutouts 582 may prevent a drill from forming a wire or ribbon of material. Such ribbons may scratch or damage a surface of a workpiece. Moreover, the cutouts 582 may prevent the annular sleeve 556 from generating chips during the drilling process.

Figure 17:
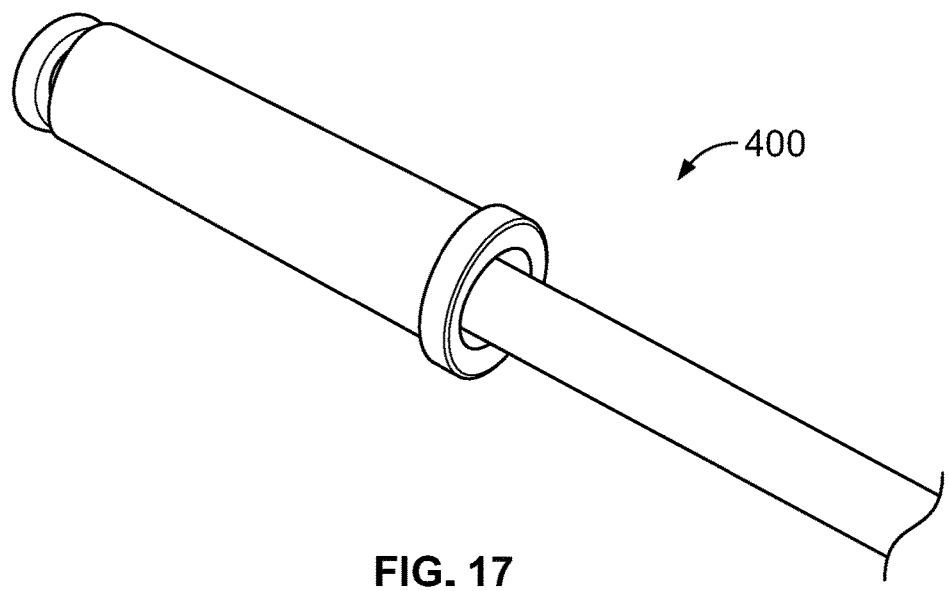
FIGS. 17-19 are views of an exemplary prototype of a blind tacking rivet in accordance with embodiments disclosed herein.
Figure 18:
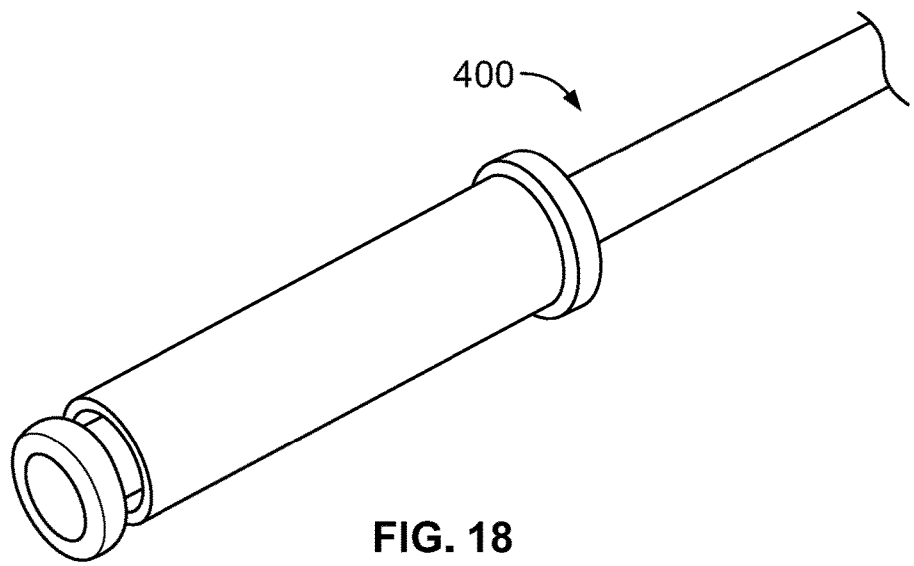
Figure 19:
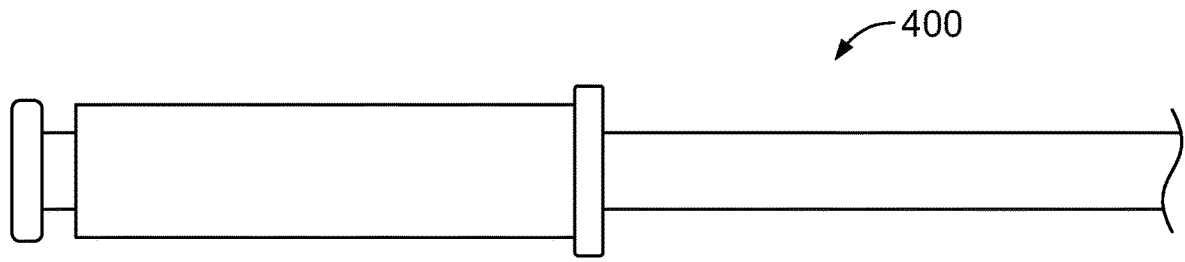

FIGS. 17-19 are an exemplary prototype 600 of a tacking rivet in accordance with various disclosed embodiments. The prototype 600 may comprise similar aspects as the tacking rivets described with reference to the various figures.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define embodiments disclosed herein. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A blind tacking fastener comprising:
    a stem comprising:
        a gripping portion;
        a stem head including a peripheral fraction ring with an outer diameter; and
        a body extending from the stem head to the gripping portion; and
    a sleeve comprising an inner channel defining an inner diameter, wherein the outer diameter is greater than the inner diameter and wherein the body of the stem passes through the inner channel, and wherein the stem comprises a first material and the sleeve comprises a second material selected such that the fraction ring fractures from the body, in response to a pulling force exerted on the gripping portion, so that: (i) all of the body is removed from the sleeve, and (ii) first and second ends of the sleeve are deformed radially outward to hold and pull together workpieces disposed between the first and second ends.

2. The blind tacking fastener of claim 1, wherein the fraction ring is operatively embedded within the sleeve as a result of the pulling force.

3. The blind tacking fastener of claim 1, wherein the sleeve comprises at least one of aluminum or an aluminum alloy.

4. The blind tacking fastener of claim 3, wherein the stem comprises steel.

5. The blind tacking fastener of claim 1, wherein the first end has an annular shoulder.

6. The blind tacking fastener of claim 5, wherein the second end comprises an inner perimeter and an outer perimeter, the inner perimeter generally offset from the outer perimeter.

7. The blind tacking fastener of claim 1, further comprising a bulb disposed between the fraction ring and end of the sleeve.

8. A method of installing a blind tacking fastener, comprising:
    providing a tacking fastener comprising a stem and a sleeve, the stem having a serrated portion and a stem head with a peripheral fraction ring;
    inserting the stem and sleeve through one or more apertures of one or more workpieces such that the stem head is on a blind side of the workpiece;
    applying a pulling force to the serrated portions sufficient to detach the fraction ring, create deformations at opposing ends of the sleeve to hold and join the one or more workpieces together; and
    removing remaining portions of the stem from the sleeve.

9. The method of claim 8, further comprising selecting a softer material for the sleeve in comparison to a material selected from the stem so to allow for detachment of the fraction ring and removal of the remaining portions of the stem from the sleeve.

10. The method of claim 8, further embedding the fraction ring within the sleeve.

11. The method of claim 10, further comprising selecting a softer material for the sleeve in comparison to a material selected from the stem so to allow for detachment of the fraction ring and removal of the remaining portions of the stem from the sleeve.

12. A blind tacking fastener comprising:
    a stem comprising:
        a gripping portion;
        a stem head including a peripheral fraction ring that detaches from the stem when sufficient axial force is exerted on the gripping portion; and
        a body extending from the stem head to the gripping portion;
    a sleeve comprising an inner channel, wherein the body of the stem passes axially through the inner channel; and
    a bulb positioned about the body of the stem, between the fraction ring and the sleeve.

13. The blind tacking fastener of claim 12, wherein the bulb is a separate construction from the stem.

14. The blind tacking fastener of claim 12, wherein the bulb is of unitary construction with at least one of the stem head or the body.

15. The blind tacking fastener of claim 12, wherein the bulb comprises a generally frustoconical cross-sectional shape when not deformed.

16. The blind tacking fastener of claim 12, wherein an end of the sleeve proximal the bulb is angled towards the inner channel to direct the bulb towards the channel.

* * * * *